United States Patent
LaWhite et al.

(10) Patent No.: US 7,827,861 B2
(45) Date of Patent: Nov. 9, 2010

(54) POSITION CORRECTION IN SODAR AND METEOROLOGICAL LIDAR SYSTEMS

(75) Inventors: Niels LaWhite, Somerville, MA (US); Louis Manfredi, Amherst, MA (US); Walter L. Sass, Somerville, MA (US)

(73) Assignee: Second Wind, Inc., Somerville, MA (US)

( * ) Notice: Subject to any disclaimer, the term of this patent is extended or adjusted under 35 U.S.C. 154(b) by 0 days.

(21) Appl. No.: 12/130,106

(22) Filed: May 30, 2008

(65) Prior Publication Data

US 2009/0049905 A1 Feb. 26, 2009

Related U.S. Application Data

(63) Continuation-in-part of application No. 12/117,994, filed on May 9, 2008, and a continuation-in-part of application No. 12/125,166, filed on May 22, 2008, and a continuation-in-part of application No. 11/934,915, filed on Nov. 5, 2007.

(60) Provisional application No. 60/941,387, filed on Jun. 1, 2007.

(51) Int. Cl.
*G01W 1/00* (2006.01)
(52) U.S. Cl. .............. 73/170.01; 73/170.11; 73/170.16; 356/28.5
(58) Field of Classification Search .............. 73/170.16, 73/170.01
See application file for complete search history.

(56) References Cited

U.S. PATENT DOCUMENTS

| | | | |
|---|---|---|---|
| 3,675,191 A | 7/1972 | McAllister | |
| 4,286,462 A | 9/1981 | Bourne | |
| 4,558,594 A | 12/1985 | Balser | |
| 4,573,352 A | 3/1986 | Hurtig | |
| 4,641,290 A | 2/1987 | Massa et al. | |
| 4,831,874 A | 5/1989 | Daubin | |
| 4,833,360 A | 5/1989 | Holly | |
| 4,914,750 A | 4/1990 | Lawson | |
| 5,509,304 A | 4/1996 | Peterman | |
| 5,521,883 A | 5/1996 | Fage | |
| 5,544,525 A | 8/1996 | Peterman | |
| 5,808,967 A | 9/1998 | Yu | |

(Continued)

OTHER PUBLICATIONS

Hummon, J.M. et al., "A Direct Comparison of Two RDI Shipboard ADCP's: a 75-kHz Ocean Surveyor and a 150-kHz Narrow Band," Journal of Atmospheric and Oceanic (con't).

(Continued)

*Primary Examiner*—Andre J Allen
(74) *Attorney, Agent, or Firm*—Brian M. Dingman; Mirick, O'Connell, DeMallie & Lougee, LLP

(57) ABSTRACT

A system and method for correcting wind speed and direction data collected by a sodar or lidar apparatus for the orientation and/or position of the apparatus. There are sensors mounted to the sodar or lidar apparatus that detect the orientation and position of the apparatus. Software is used to adjust in situ the calculations of wind speeds and directions in three dimensions for deviations from some nominal orientation. Software and data structures can be used to cause the inclusion of the orientation and position of the system with the collected data.

22 Claims, 6 Drawing Sheets

U.S. PATENT DOCUMENTS

| | | | |
|---|---|---|---|
| 6,097,669 | A | 8/2000 | Jordan |
| 6,384,516 | B1 | 5/2002 | Fraser |
| 6,427,531 | B1 | 8/2002 | Chintawongvanich |
| 6,437,738 | B1 | 8/2002 | Law |
| 6,448,923 | B1 | 9/2002 | Zrnic |
| 6,535,158 | B2 | 3/2003 | Wilkerson |
| 6,608,237 | B1 | 8/2003 | Li et al. |
| 6,644,590 | B2 | 11/2003 | Terpay |
| 6,755,080 | B2 | 6/2004 | Martin |
| 6,856,273 | B1 | 2/2005 | Bognar |
| 7,061,475 | B2 | 6/2006 | Kent |
| 2004/0031203 | A1 | 2/2004 | Russell et al. |
| 2005/0036647 | A1 | 2/2005 | Nguyen |
| 2005/0074129 | A1 | 4/2005 | Fan |
| 2005/0165313 | A1 | 7/2005 | Byron et al. |
| 2006/0057351 | A1 | 3/2006 | Yang et al. |
| 2006/0179934 | A1* | 8/2006 | Smith et al. .............. 73/170.11 |
| 2006/0225952 | A1 | 10/2006 | Takayasu |
| 2007/0236367 | A1* | 10/2007 | Matayoshi et al. .......... 340/973 |
| 2008/0148839 | A1* | 6/2008 | Tillotson et al. ......... 73/170.16 |
| 2009/0049905 | A1* | 2/2009 | LaWhite et al. .......... 73/170.13 |
| 2010/0085557 | A1* | 4/2010 | Antoniou et al. ........... 356/28.5 |
| 2010/0195089 | A1* | 8/2010 | Wu et al. ................... 356/28.5 |

OTHER PUBLICATIONS (con't) Technology, vol. 20, pp. 872-887 (2002).
International Search Report mailed Jan. 29, 2009, in PCT Application No. PCT/US2008/65266.
International Search Report mailed Jul. 15, 2008, in PCT Application No. PCT/US2008/063196; International Filing Date: May 9, 2008; (con't).
(con't) First Named Inventor: Niels LaWhite.
International Search Report mailed Jul. 22, 2008, in PCT Application No. PCT/US2008/064463; International Filing Date: May 22, 2008; (con't).
Rinehart, Antenna Measurements: Dihedrals, ground targets and antenna beam patterns, AMS Radar Workshop, Jan. 14, 2001.
Argonne National Laboratory at http://www.atmos.anl.gov/ABLE/minisodar.html (last visited Nov. 1, 2007).
Atmospheric Research & Technology, LLC at http://www.sodar.com/about_sodar.htm (last visited Nov. 1, 2007).
Atmospheric Systems Corporation at http://www.minisodar.com/public/minisodar/cover.htm (last visited Nov. 1, 2007).
Bristol Industrial and Research Associates Limited a/k/a Biral at http://www.biral.com/met/sodar/2sodars.htm (last visited Nov. 1, 2007).
Bristol Industrial and Research Associates Limited a/k/a Biral at http://www.biral.com/images/met/sodar/2asodarssm.jpg (last visited Nov. 1, 2007).
Bristol Industrial and Research Associates Limited a/k/a Biral at http://www.biral.com/met/sodar/dimensions.htm (last visited Nov. 1, 2007).
Bristol Industrial and Research Associates Limited a/k/a Biral at http://www.biral.com/met/sodar/control.htm (last visited Nov. 1, 2007).
HV Sistemas S.L. at http://www.hvsistemas.es/en/sol/SODAR.html (last visited Nov. 1, 2007).
University of Northern British Columbia at http://cirrus.unbc.ca/images/sm_sodrad.jpg (last visited Nov. 1, 2007).
Wikipedia at http://www.en.wikipedia.org/wiki/Sodar (last visited Nov. 1, 2007).
International Search Report mailed Dec. 16, 2008, in corresponding PCT Application No. PCT/US2008/065222; International Filing Date: May 30, 2008; (con't).

* cited by examiner

POSITION CORRECTION IN SODAR AND METEOROLOGICAL LIDAR SYSTEMS

CROSS REFERENCE TO RELATED APPLICATIONS

This application is a continuation in part of application Ser. No. 11/934,915 filed on Nov. 5, 2007. This application is also a continuation in part of application Ser. No. 12/117,994 filed on May 9, 2008. This application is also a continuation in part of application Ser. No. 12/125,166 filed on May 22, 2008. The entire disclosures of these three applications are incorporated herein by reference. This application also claims priority of Provisional Patent Application Ser. No. 60/941,387, filed on Jun. 1, 2007, the entire disclosure of which is incorporated herein by reference.

FIELD OF THE INVENTION

The present invention relates to a system for remotely detecting atmospheric phenomena such as wind speed using either directed sound waves or laser beams.

BACKGROUND OF THE INVENTION

Sodar systems employ directed sound waves to detect atmospheric phenomena such as wind speed. Meteorological lidar systems use laser beams for the same purpose. The apparatuses housing the active transducers of these systems are generally deployed in fixed, carefully oriented positions in the field, such that the angles of emitted and detected signals have known relations to vertical and horizontal coordinates. Usually this requires leveling the platform upon which the transducers are mounted, and turning the platform such that it is aligned with a compass point, e.g., due north. Such systems calculate wind speeds and directions based on the prerequisite fixed orientation of the transducers.

Wind speed measurements made for the purposes of wind energy resource assessment are expected to be rather accurate; typically ±0.5 mph (approximately ±0.23 m/s). As such, the errors that would be introduced by tilting of the apparatus of only a few degrees are important to correct in this application. Additionally, at many sites wind speed can vary to an extent which significantly affects the economic viability of a potential wind turbine installation over a very short geographic distance. As a result, precise and accurate information regarding the location at which a measurement for wind energy was made is essential.

Existing and near future wind energy installations are on dry land or near-shore sea locations. Resource assessment equipment for such sites can and has been mounted on stable foundations on land and on the near-shore seabed. Resource availability and other siting issues related to these terrestrial and near-shore sites are motivating research, including resource assessment studies, into deeper water installations where fixed foundations are prohibitively expensive. Buoy, barge, or ship mounted wind measurement equipment, typically used to measure wind velocity in such locations, is inadequate for resource assessment in several respects. The measurements are typically made within a few meters of the sea surface, while resource assessment data is preferably taken at turbine hub height, typically 60-110 meters above the sea surface for modern utility scale turbines. Further, the accuracy of conventional anemometry mounted on floating structures is adversely affected by the motion of these structures. Also, the location of these sensors relative to their support structures is often such that the structures adversely affect accuracy by influencing the airflow. Finally, in particular for ship-based measurements, the duration of measurement is inadequate for resource assessment, where measurement periods of up to a year or more are considered necessary for accurate resource assessment.

To date no sodar or lidar equipment has been built which is suitable for making measurements sufficiently accurate for resource assessment on non-stationary structures.

SUMMARY OF THE INVENTION

In one embodiment, the invention comprises sensors in the sodar or lidar systems that detect the apparatus orientation and position, and operational software ("firmware") that uses at least the sensed orientations to adjust in situ the calculations of wind speeds and directions in three dimensions for deviations from some nominal orientation, such that the accuracy of the measurements is not degraded. The firmware performs the calculations in real time, based on orientation and position information measured on a continuing basis to maintain reliable data accuracy even in the presence of post-installation orientation or position shift of the system which might otherwise degrade data accuracy. Further, data structures identifying the algorithm used to correct for the orientation and position of the system, and the orientation and position data serving as the input to this algorithm, are included with all collected, transmitted, and archived data for documentary purposes.

One of the benefits of the inventive orientation compensation is that the sodar or lidar apparatus need not be oriented precisely at the time of installation. Further, installation time is reduced, since precise orientation can be tedious. Also, the apparatus need not have a finely adjustable leveling mechanism, nor does the apparatus need to be installed on level ground. Even if it may be securely anchored or guyed to the ground, minor shifting or settling of the apparatus may occur as a result of wind loading, ground settling due to precipitation, or other environmental factors. By continually monitoring apparatus orientation and position, data remains reliable despite such movements. The invention can compensate for the expansion or contraction of the sodar or lidar apparatus with ambient temperature changes that can be of sufficient magnitude to affect the accuracy of the orientation, especially with plastic structures which may be economical and expedient for other reasons.

Also, there may be site obstructions that interfere with signal transmission or detection, which can be avoided by orienting the apparatus as needed. In the case of floating sodar or lidar systems, platform motion can be accounted and corrected for. Also, the invention generally increases the confidence level of all transmitted and/or collected data. Further, compared against competitive apparatuses which may report, but not automatically compensate for, orientation and positioning errors, the invention reduces or eliminates the need for post-processing orientation correction of the data. Additionally, geographic position information derived from a Global Positioning System receiver "GPS" built into the instrument can be used to identify with certainty the location at which the measurements are being made and to compensate for errors in the electronic compass by automatically including the effects of known location-specific magnetic anomalies, which have been mapped and for which data is available.

This invention features a system for correcting wind speed and direction data collected by a sodar or lidar apparatus for at least the orientation of the apparatus, comprising one or more sensors mounted to the sodar or lidar apparatus that detect at least the three-dimensional angular orientation of the apparatus, and software that uses the detected three-dimensional angular orientation to adjust in situ the calculations of wind speed and direction data in three dimensions for deviations from some nominal orientation.

The system may further comprise one or more additional sensors mounted to the apparatus that detect the position of the apparatus. The system may further comprise software and data structures that cause the inclusion of data indicative of the orientation and position of the apparatus with the collected data. The software may perform the calculations in real time, based on orientation measured on a continuing basis to maintain reliable data accuracy even in the presence of post-installation positional shift of the apparatus which might otherwise degrade data accuracy.

The directional orientation may be measured with an electronic two or three axis compass, and tilt from vertical may be measured with a two axis accelerometer-based inclinometer. The system may further comprise a third accelerometer axis. The system may further comprise one or more gyroscopes or other angular acceleration measurement sensors to also account for angular motion of the apparatus, along with motion along horizontal axes, to properly distinguish between angular inclinations and axial accelerations of the apparatus to correct for dynamic motions of the apparatus. The system may further comprise a GPS receiver that is used to measure the position of the apparatus. The GPS receiver may also measure directional orientation.

Also featured is a method of correcting wind speed and direction data collected by a sodar or lidar apparatus for at least the orientation of the apparatus, comprising detecting at least the three-dimensional angular orientation of the sodar or lidar apparatus, and using the detected three-dimensional angular orientation to adjust in situ the calculations of wind speed and direction data in three dimensions for deviations from some nominal orientation.

The method may further comprise detecting the position of the apparatus. The method may further comprise causing the inclusion of the orientation and position information of the apparatus with the collected data. The software may perform the calculations in real time, based on orientation measured on a continuing basis to maintain reliable data accuracy even in the presence of post-installation position or angular shift of the apparatus which might otherwise degrade data accuracy. Directional orientation may be measured with an electronic two or three axis compass, and tilt from vertical is measured with a two axis accelerometer-based inclinometer.

Angular accelerations, velocities and orientation of the apparatus may be measured using one or more gyroscopes, solid-state gyroscopes, or other angular measurement sensors to properly distinguish between angular inclinations and axial accelerations of the apparatus to correct for dynamic motions of the apparatus. The position of the apparatus may be measured using a GPS receiver. The GPS receiver may also measure directional orientation of the apparatus. Software may perform the calculations based on information provided at least in part by a user. In one embodiment, the user can override the detection of one or more of the orientation and position of the apparatus, so that the software performs the calculations based on information provided at least in part by a user.

Also featured is a method of correcting wind speed and direction data collected by a sodar or lidar apparatus for the orientation and/or position of the apparatus, comprising providing the three-dimensional angular orientation of the sodar or lidar apparatus, and using the provided three-dimensional angular orientation to adjust in situ the calculations of wind speed and direction data in three dimensions for deviations from some nominal orientation. The three-dimensional angular orientation may be provided at least in part with one or more instruments coupled to the sodar or lidar apparatus, and may be provided at least in part by a user who has overridden the instruments. Alternatively, the three-dimensional angular orientation may be provided by a user. The method may further comprise detecting failures of the one or more instruments, and in which the last valid orientation information is used to adjust the calculations of windspeed and direction.

BRIEF DESCRIPTION OF THE DRAWINGS

Various other objects, features and advantages of the present invention will become fully appreciated as the invention becomes better understood when considered in conjunction with the accompanying drawings, in which like reference characters designate the same or similar parts throughout the several views, and wherein.

DETAILED DESCRIPTION OF EMBODIMENTS OF THE INVENTION

Figure 1:
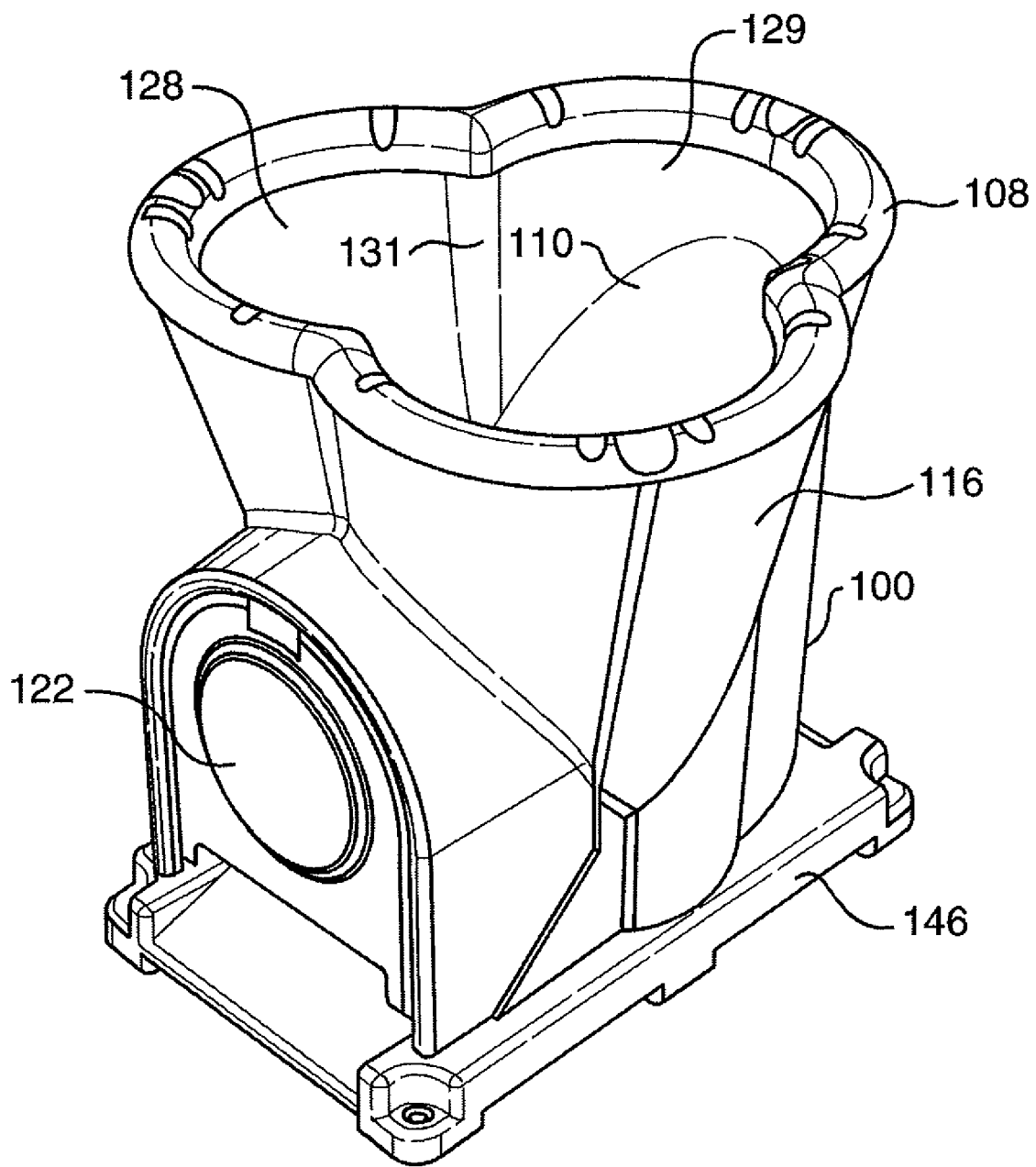
FIG. 1 is a front perspective view of a sodar apparatus with which the invention can be used.
Figure 2:
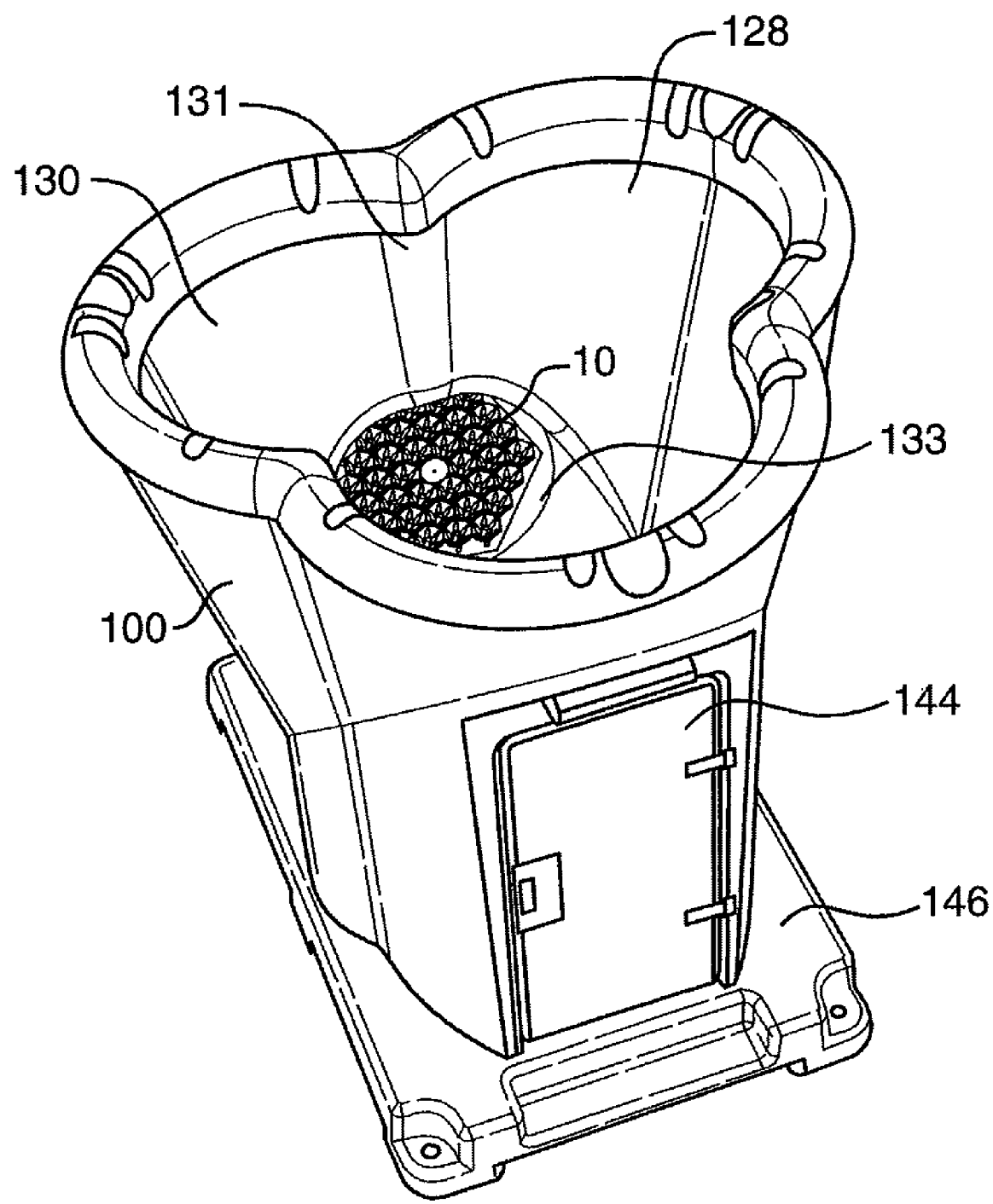
FIG. 2 is a rear perspective view of the sodar apparatus of FIG. 1.
Figure 3:
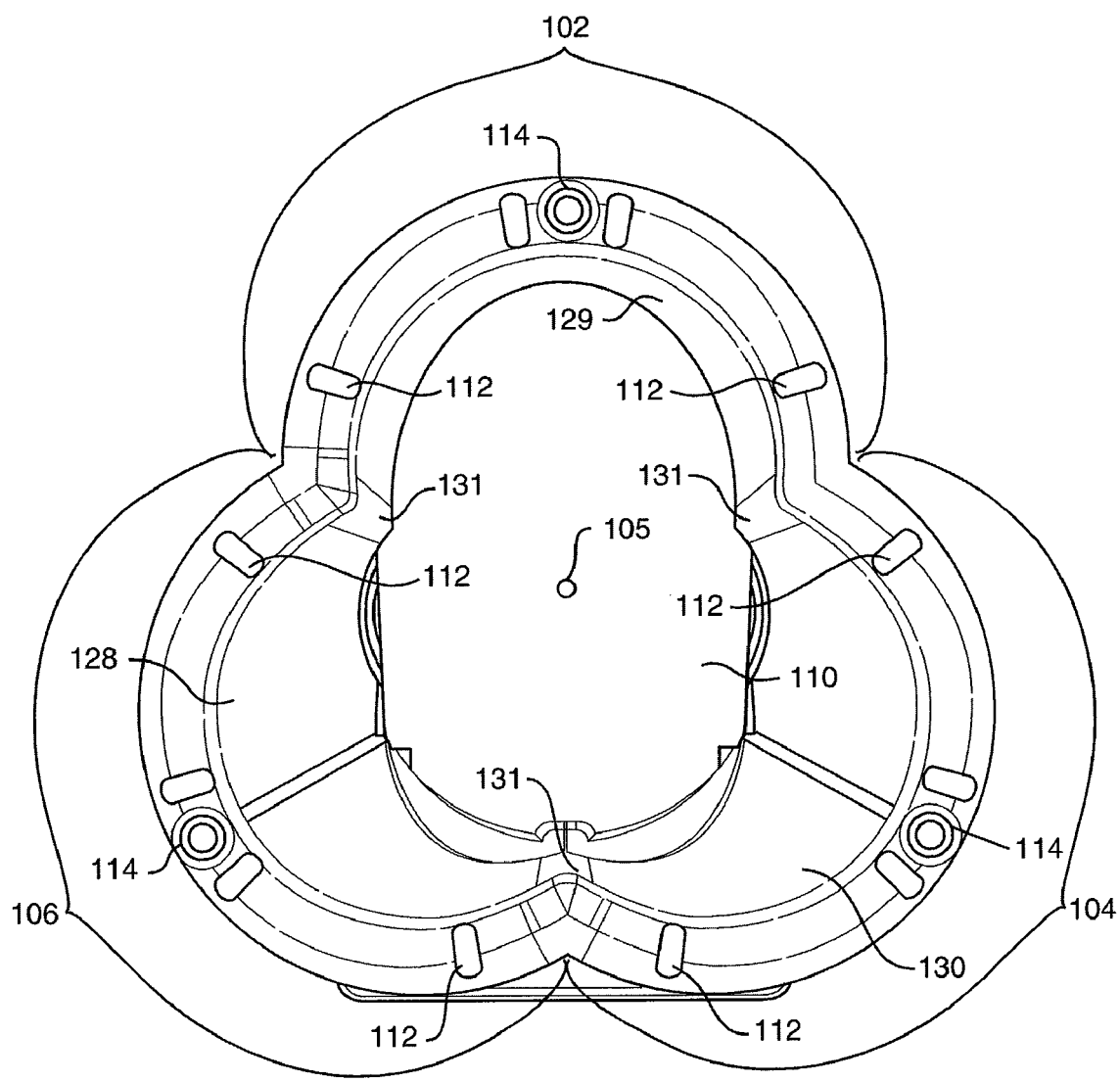
FIG. 3 is a top view of the sodar apparatus of FIGS. 1 and 2.

This invention may be accomplished in a system for correcting wind speed and direction data collected by a sodar or lidar apparatus for the orientation and/or position of the apparatus. The system applies to any type or form of sodar or meteorological lidar apparatus. The system includes sensors mounted to the sodar or lidar apparatus that detect the three-dimensional angular orientation and the position of the apparatus. Software is then used to adjust in situ the calculations of wind speeds and directions in three dimensions for deviations from some nominal apparatus orientation. Additional software and data structures can be used to cause the inclusion of the orientation and position of the system in a database along with the collected data.

In an embodiment of the invention for land-based sodar or lidar, directional orientation is measured with an electronic 2 or 3 axis compass, and tilt from vertical is measured with a 2 axis accelerometer-based inclinometer. Each of these instruments is coupled to the sodar or lidar apparatus. In an alternative embodiment of the invention for such systems mounted aboard vessels or buoys which float on water, the invention additionally employs a third accelerometer axis and perhaps traditional electromechanical gyroscopes, solid-state gyroscopes, or other angular acceleration measurement sensors to also determine the instrument's three-dimensional vector velocity, and dynamic angular position which is necessary to correct measurements for errors caused by motion of the instrument.

In an embodiment of the invention, a GPS receiver coupled to the apparatus is used to determine the geographic coordinates of the sodar or lidar system, and provide an accurate synchronization with Universal Time (UT, formerly "Greenwich Mean Time"). An alternative embodiment of the invention uses a specialized form of GPS receiver that also determines directional orientation, to measure the system's directional orientation, which obviates the need for an electronic compass.

In an embodiment of the invention for land-based used applications, the firmware is provided with user controls such that the real-time continuing measurements of position and orientation can be overridden and replaced with manually entered data. This allows the instrument to continue to operate in the event of the failure of a position or orientation sensor.

Also, for land-based applications, the firmware can be provided with a feature such that if a sensor signal is briefly lost the last known valid value of this signal is applied to the algorithm, and if the signal loss persists or becomes repetitive the user is alerted to the problem so that steps can be taken to restore the system to operation with full real-time automatic orientation correction.

In an alternative embodiment for the land-based application of the invention, no automatic real-time orientation data is supplied to the algorithm, but the algorithm still retains the ability to correct for orientation errors based on orientation information manually entered by the user, such information alternatively coming from either built-in sensors in the instruments or from measurements made by other means. Such embodiments exhibit some, but not all, benefits of the preferred embodiment.

Automatic position compensation works for a wide range of apparatus positions, but it has some obvious limitations. For example, if the apparatus is blown or otherwise pushed over on its side, such that the emitted and detected signals were primarily horizontal, position compensation would be ineffective. On the other hand, the position detection afforded by the required sensors and processing of their data can be used to issue alarms or otherwise notify the operators of problems. Similarly, reporting of the actual position with collected data can also be used to determine if the apparatus has settled or is settling, has moved or is being moved, etc.

FIGS. 1-5 show an embodiment of a sodar apparatus with which the invention can be used. This is but one example of the myriad types and forms of sodar and lidar systems with which the invention can be used. The particular sodar apparatus shown in FIGS. 1-5, the preferred transducer array, and the preferred operation of the transducer array, are disclosed in more detail in priority applications Ser. No. 11/934,915 filed on Nov. 5, 2007, Ser. No. 12/117,994 filed on May 9, 2008, and Ser. No. 12/125,166 filed on May 22, 2008, the entire disclosures of which are incorporated herein by reference.

Horn-shaped enclosure 100 is symmetrically shaped, defining three identically-shaped lobes 102, 104 and 106 spaced 120° apart about central vertical axis 105 of enclosure 100. In enclosure 100, array 10 is preferably positioned vertically, behind access door 122 and directly facing flat sound-reflecting surface 110 that is 45° from vertical so that it acts as a sound mirror. See the cross-sectional view of FIG. 5. This arrangement acoustically approximates the same array 10 being positioned horizontally at the center bottom of the enclosure. The vertical array position inhibits the transducers from collecting water, ice, snow, or debris.

In one non-limiting embodiment, each transducer is about three inches in diameter, and the array is operated at frequencies corresponding to wavelengths of approximately 3 inches. A typical frequency may be 4425 Hz. Sounds near this wavelength have been found to both reflect from and travel through turbulence and thermal gradations in the atmosphere, a compromise that is essential to sodar operation. With the preferred array made up of thirty six transducers in seven rows, the phase shift from row to row is about 60 degrees, (or, about $3.75 \times 10^{-5}$ sec) which accomplishes an essentially vertical beam, tilted slightly from the vertical at about ten degrees (more specifically at 11.2 degrees) in altitude from the normal to the plane of the transducers, and with a main beam angular width of about five degrees measured from the main beam axis to the half power point. The beam power drops to about zero at a null that is located at about ten degrees from the beam main axis (a total beam width of about twenty degrees). Preferably, each of the three lobes, 102, 104 and 106 of housing 100 defines an inner surface that lies at about the location of this null. In cases in which the enclosure is lined with sound-absorbing material, this inner surface is defined as the inner surface of the sound-absorbing material. This allows the full main beam to be utilized in atmospheric sensing while helping to intercept and thus squelch both unwanted emanations that are not part of the main beam, and unwanted return signals that are not reflections of the main beam. Alternatively, the inner surface of the enclosure can lie closer to the main axes of the beams, which will create narrower, less powerful beams.

The preferred embodiment of the array has thirty-six coplanar transducers arranged in a hexagonal grid pattern. One reason for this quantity of transducers is due to the electronics in the preferred embodiment, which were designed around integrated circuits that are generally used for surround sound applications. These circuits each have 3 left and 3 right channels—for a total of six each. So each sixty-degree segment of the array can be neatly handled by one of these circuits, for a total of six geometrically and electronically identical subdivisions of the transmitting circuit. Adding a 37th transducer to the center of the array thus adds substantial complexity to the transmitting circuit design, as well as to the firmware. Testing indicated that the center speaker doesn't have a substantial impact on the directionality of the unit—at best it might increase directionality by 3%, while it increases cost and complexity of the electronic equipment by perhaps as much as 17%. Accordingly, leaving the center speaker out is an appropriate trade-off between cost and functionality.

Figure 5:
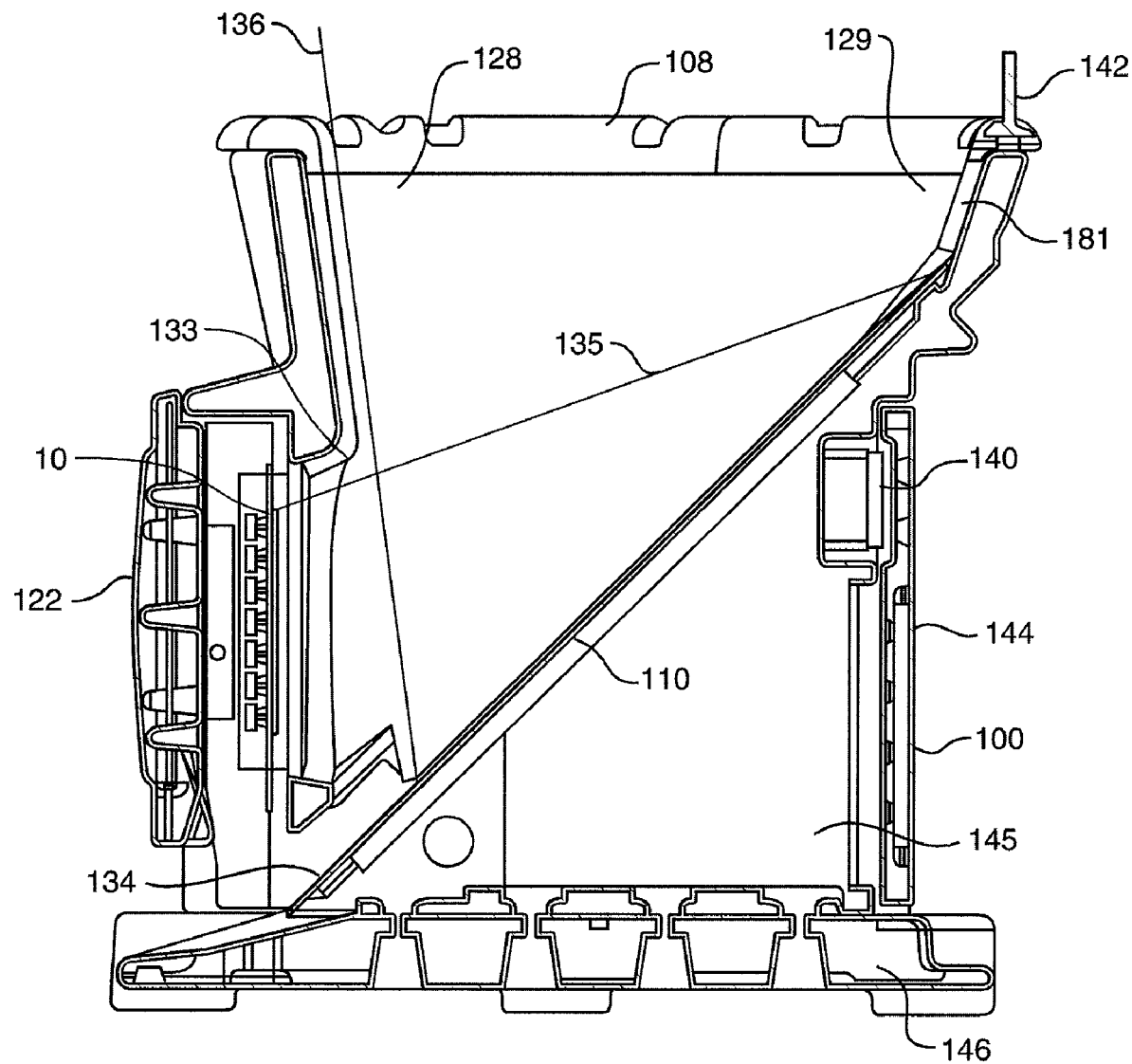
FIG. 5 is a cross-sectional view of the sodar apparatus of FIGS. 1-4.

As discussed, the preferred embodiment of the enclosure of the invention is comprised of a structure 100 that is shaped to partially envelop with some accuracy the multiple desired beams and corresponding cones of sensitivity of the sodar. Interior sidewalls 128, 129 and 130 are partially conical, each circumscribing approximately half of a main beam, and located at the first null, as described below. These walls are preferably lined with a sound absorbing material. For example, as shown in FIG. 5, the interior of sidewalls 128 and 129 shown in the drawing are lined with one or more layers of sound absorbing material 181. The generally conical wall 133 that is very close to array 10 is also lined with material 181.

The preferred lining is a single layer of 1½" thick white felt, which is a non-woven material made from polyester fibers of varying diameters and provided by National Non-Woven Fiber Inc. of Easthampton, Mass., or an equivalent such as more than one layer of this material, a different total thickness of this material, or a different non-woven material such as a natural-fiber felt. The preferred felt-like material can be made of various types of synthetic fibers, such as polyester, polyethylene, polypropylene, or nylon. The fibers are of various deniers, typically ranging between 0.8 and 100 denier. The material is a carded web that is cross-laid and needle punched. The material can be stiffened as desired by heat setting or additive treatment. The thickness is about 1.6". The weight is about 72 ounces per square yard. The material comprises about 80% void volume. The differing fiber sizes and large amount of void space provide excellent sound damping in the frequency range of interest of around 4000 Hz. The material is preferably adhered to essentially all of the inside faces of the housing that are exposed to a sound beam using an appropriate pressure-sensitive adhesive film that is applied to one face of the felt material. Test results of this preferred lining material are set forth below. Enclosure 100 is designed such that the surface of the absorbing felt material is coincident with the predicted and experimentally verified first major "null" position of the beam/cone. The thickness of the felt is preferably at least about as large as one-half of the wavelength of the sound emitted by the array; this thickness ensures that any sound that reflects off of the underlying enclosure walls must travel through a thickness at least about equal to the wavelength, which increases sound damping.

Upper lip 108 of housing 100 is preferably rounded with a large radius, preferably equal to or larger than the wavelength of the transmitted sound. Three identical semi-elliptical upper lip segments tie the structure together by being bolted to threaded inserts in the enclosure body 116 at six positions 112, and to pairs of threaded inserts at three positions 114. The lip sections essentially lie along the intersection of a horizontal plane and each of the three angled cones that are defined by the first nulls of the three sound beams. Enclosure lifting and/or anchoring eyebolts can be threaded into inserts at locations 114. Alternatively, a satellite or cellular antenna 142 can be mounted at one location 114, or perhaps multiple such locations.

Since the beams of a single-array sodar emanate from the surface of a single phased array 10, but in different directions, their conic profiles overlap spatially near the array. This means that the enveloping structure has an unusual "fluted" shape as shown in the drawings. If the shape were extended vertically, it would become a three-horned enclosure joined at the base. Since the height of such a structure would be impractical, the fluted shape is best for the desired portability of the sodar system. The enclosure wall making up each of the three flutes generally defines a semi-circle in cross section; since the cones are tilted from the vertical, the horizontal cross section is elliptical. The cones all emanate from array 10, taking into account 45° reflector 110. In the preferred embodiment, the structure has an overall height, from bottom of the mounting base 146 of approximately 74 inches. The width measured to outside of lip 108 at the widest point between any two flutes is approximately 70 inches.

The central cavity of the structure is substantially the union of three overlapping conic sections to allow three conical beams to pass unimpeded from the structure. Radiused surfaces or fillets 131 are provided so as to allow conic sections 128, 129, and 130 to join without a sharp corner. Such a sharp corner would be undesirable due to manufacturing and structural considerations, and might introduce undesirable diffraction of off-axis sound which would otherwise be properly intercepted by the structure. The small areas that result from these radii constitute the areas of the opening of the structure which are not needed by any of the three beams. Since these areas are quite small, the harm caused by their presence is small compared to the benefits of the radii.

In the preferred embodiment, the housing envelops accurately the shape of the conic beams as they travel approximately horizontally from the phased array to the mirror, and also envelops the beam shape as it reflects off the mirror and out the top of the housing. Surface 133, shown in FIG. 5, surrounds the three conical sound beams immediately following their emission from array 10. This surface encloses the union of the volume taken up by the three beams. The shape of surface 133 is essentially a conical section. More specifically, preferably its shape is an extension of the three-lobed fluted shape of the interior of the enclosure, reflected off of the sound mirror at the location of surface 133. Immediately after exiting array 10, the beams overlap substantially enough that the difference in shape between three overlapping cones and a single essentially conical shape is not very pronounced, and surface 133 could, in fact, be formed as a simple conical section surface with little difference in performance. Although the extent of surface 133 is not large, its proximity to array 10 is such that it is of more significant importance in intercepting the side lobes emitted by array 10 than its size would suggest.

Other embodiments are possible where the shape of the housing does not continuously follow the shape of the beams. In an extreme case, the housing could have an arbitrary, for example rectilinear, shape with only the opening at the top contoured to the cross-section of the beams as they exit the housing, for example through use of the same lip as in the preferred embodiment. To perform as well as the preferred embodiment, such a rectilinear housing would require superior sound absorbent material to damp internal beam reflections. Of course the invention can be applied to sodar and lidar housings of any shape.

Figure 4:
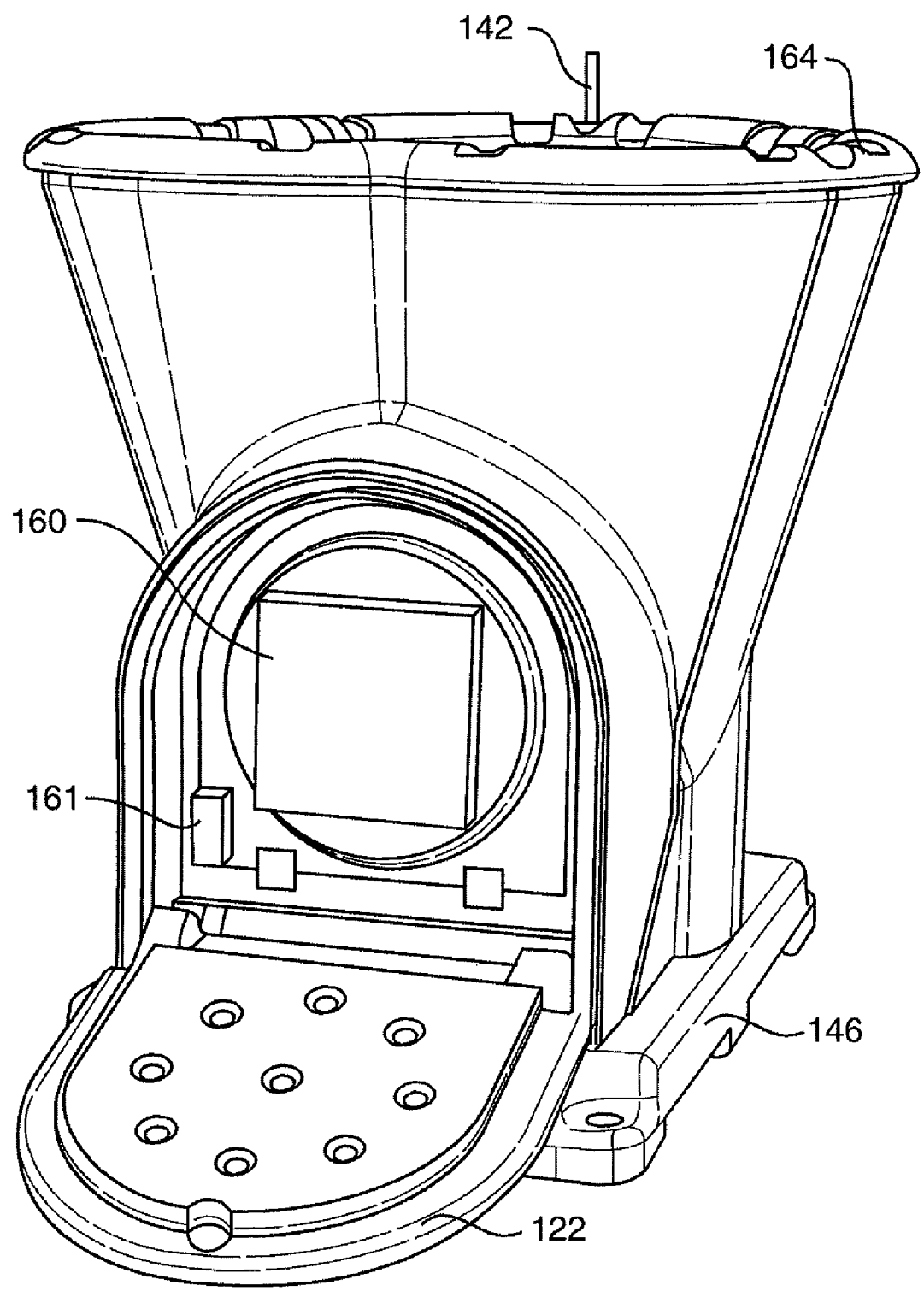
FIG. 4 is a more detailed view of the front of the sodar apparatus of FIGS. 1-3 with the access door to the electronic equipment open.

FIG. 4 shows sodar enclosure 100 with electronics access door 122 open. Vertical enclosure 160 contains the principal electronic components of the sodar system, including processing circuitry, and is the mounting means for the loudspeaker array. Small separate enclosure 161 contains small horizontal circuit boards (not shown), on which are mounted an electronic 2-axis magnetometer-compass, and a 2-axis accelerometer/inclinometer. Sodar mounting base 146 is approximately 4 feet×2 feet in footprint. Antenna 142 is used for satellite or cellular communications, and a GPS receiver (not shown) is located under the lip at location 164.

Figure 6:
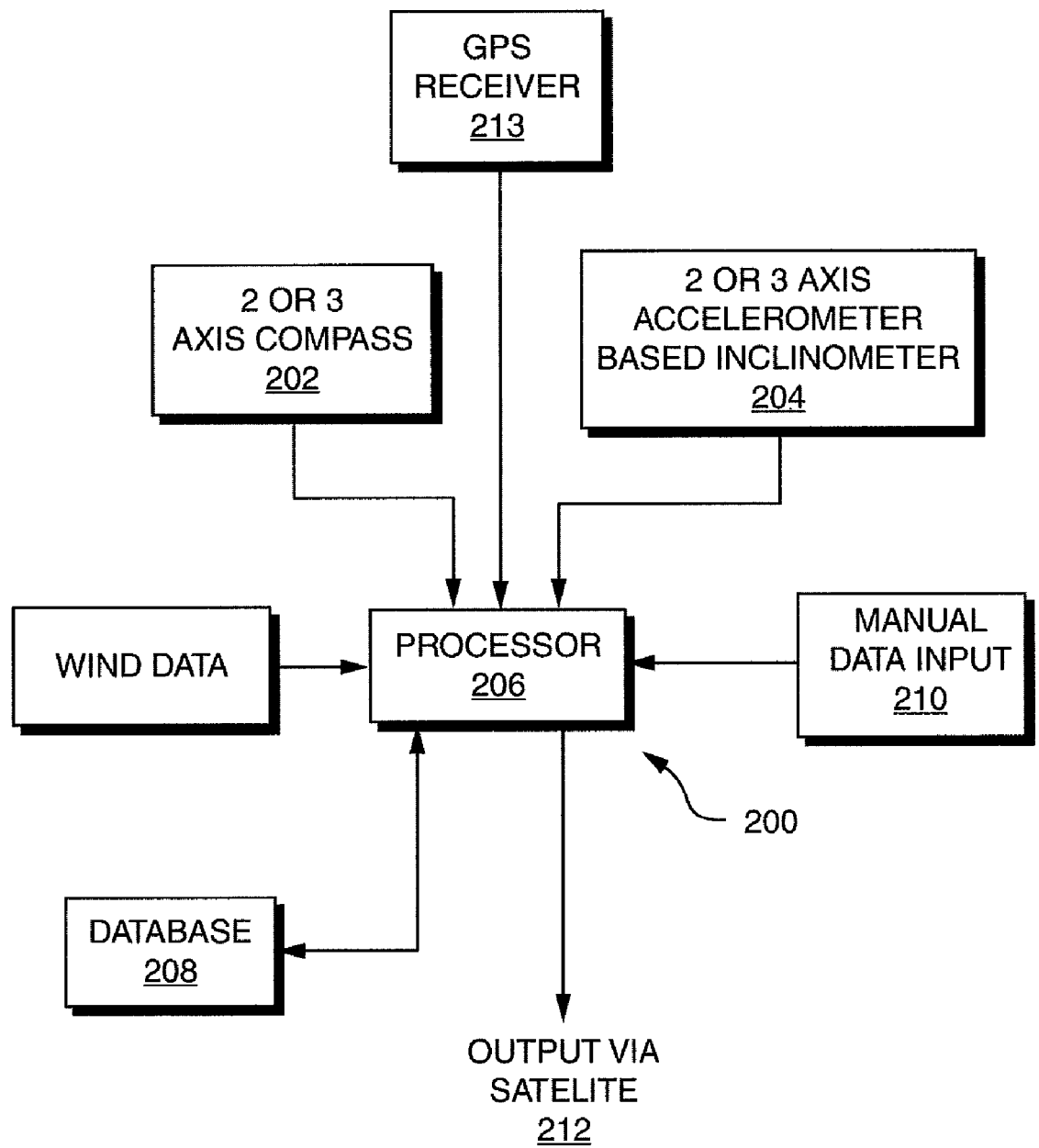
FIG. 6 is a schematic block diagram of an embodiment of the system of the invention, which can also be used to accomplish the method of the invention.

FIG. 6 shows embodiment 200 of the inventive system. System 200 can also be used to practice the inventive method. System 200 includes 2 or 3 axis compass 202, 2 or 3 axis accelerometer-based inclinometer 204 and GPS receiver 213. Processor 206 uses the direction and tilt data provided by these sensors to correct wind data that is determined by the sodar or lidar system. Database 208 can be used to store raw wind data, corrected wind data, orientation information and/or geographic position information. As described above, data structures identifying the algorithm used to correct for the angular orientation of the system, (and correct for the position of the system as necessary), and the orientation and position data serving as the input to this algorithm, are preferably included with all collected, transmitted, and archived data, for documentary purposes. The corrected data can be stored on site, e.g. in digital memory such as found in a data logger, and is transmitted, preferably via satellite link 212, for receipt by the person or entity collecting the wind data.

Manual data input 210 allows a user to provide orientation and/or tilt data as desired, either instead of data from sensor 202 and/or sensor 204 (when such sensor(s) are not present in the system), or as replacements for such data when such sensor(s) are not working properly.

For land-based applications, the firmware can be provided with a feature such that if a sensor signal is briefly lost the last known valid value of this signal is applied to the algorithm. If the signal loss persists or becomes repetitive the user is alerted to the problem via the satellite link so that steps can be taken to restore the system to operation with full real-time automatic orientation correction.

The wind measurements themselves need to be corrected for angular orientation errors of the instrument. On the other hand, position errors constitute errors in the position at which the wind measurement is made, and do not contribute to inaccuracy in the wind speed itself. For the dynamic floating installation case, position information in the sense of its derivatives, accelerations and velocities will be used for correcting the wind measurements, but position information itself will likely in the floating installation, as in the terrestrial, only be used to record where the measurement was made.

Data correction is achieved by determining actual beam directions in the terrestrial coordinate system by means of combining the orientation of the beams relative to the instrument, and the orientation of the instrument relative to a terrestrial coordinate system. Such coordinate transforms can be accomplished within the firmware algorithm by a number of means readily apparent to one skilled in the art. The corrected beam directions and the radial velocity information can then be transformed to horizontal wind velocity, direction and vertical velocity reported in the desired terrestrial coordinate system by means readily apparent to one skilled in the art.

Alternatively, and substantially equivalently, the vector wind speed can be calculated in the instrument's frame of reference, and a coordinate transform based on the instrument's orientation can be applied to this inclined vector wind speed to correct it into the desired terrestrial coordinate system.

In the case of floating sodar or lidar systems, platform motion can be accounted and corrected for. At the time of each wind speed and direction measurement, specifically at both the time of pulse transmission, and at the time of echo reception, the radial velocity of the instrument in the beam direction can be calculated. These radial velocities can be applied as corrections to the measured radial velocities. Additionally, the instantaneous orientation of the instrument can be applied to correct the radial directions.

In the case of a lidar, the time of pulse transmission and that of pulse measurement are close enough that a single measurement will suffice for the velocity and orientation measurements discussed above. The time-of travel of the lidar signal is infinitesimal compared to the expected dynamic time constant of the instrument's mounting platform. In the case of a sodar, separated measurements are necessary, since the time of travel of the signal may be long compared to the dynamic constants of the platform.

Given the above measurements, the horizontal velocity, direction, and vertical velocity (a vector wind measurement) can be calculated by one of a number of roughly equivalent means: Each triad of three beams, with associated radial velocities and directions for each of three beams can be reduced to sample vector wind measurement sample. The sample would then be averaged with vector samples from other samples to provide a useable average vector wind measurement. As a second approach, perhaps less calculation intensive, each individual radial measurement can be corrected to an equivalent velocity measurement in the stationary frame of reference and a nominal stationary direction. The resulting corrected radial measurements can then be combined and averaged, or averaged and combined as is the case with conventional stationary sodars and lidars. A third approach, perhaps computationally intensive, but perhaps most accurate, would take an aggregate of a number of measurements, in the three different nominal directions, but using actual the radial velocity and direction from each of these measurements. The data would be combined using a least-squares reduction technique to resolve the data into an equivalent average vector wind measurement.

As yet another alternative for floating systems, the instantaneous velocity and orientation of the apparatus can be measured immediately prior to transmitting the beam, and the frequency and the phasing of the beam can be adjusted to compensate for the motion and orientation, of the apparatus.

The invention also applies to lidar systems used to measure wind speed and direction. Such lidar systems are well known in the art. These systems also report data that can be corrected as described above.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, operating frequency and wavelength, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for correcting wind speed and direction data collected by a sodar or lidar apparatus for at least the orientation of the apparatus, comprising:
   one or more sensors mounted to the sodar or lidar apparatus that detect at least the three-dimensional angular orientation of the apparatus;
   a processor that uses the detected three-dimensional angular orientation and a correction algorithm to correct in situ the wind speed and direction data in three dimensions for deviations from some nominal orientation, and that detects failures of the one or more sensors and in response to the detection of a failure uses the last valid orientation information to correct the wind speed and direction data; and
   a database that stores; an identification of the correction algorithm; the detected three-dimensional angular orientation of the apparatus; and the corrected wind speed and direction data.

2. The system of claim 1 further comprising one or more additional sensors mounted to the apparatus that detect the position of the apparatus.

3. The system of claim 2 in which the database further stores data indicative of the detected position of the apparatus.

4. The system of claim 1 in which the processor performs the corrections in real time, based on orientation measured on a continuing basis to maintain reliable data accuracy even in the presence of post-installation positional shift of the apparatus which might otherwise degrade data accuracy.

5. The system of claim 1 in which directional orientation is measured with an electronic two or three axis compass, and tilt from vertical is measured with a two axis accelerometer-based inclinometer.

6. The system of claim 5, further comprising a third accelerometer axis.

7. The system of claim 6, further comprising one or more gyroscopes or other angular acceleration measurement sensors to also account for angular motion of the apparatus, along with motion along horizontal axes, to properly distinguish between angular inclinations and axial accelerations of the apparatus to correct for dynamic motions of the apparatus.

8. The system of claim 1 further comprising a GPS receiver that is used to measure the position of the apparatus.

9. The system of claim 8 where the GPS receiver also measures directional orientation.

10. A method of correcting wind speed and direction data collected by a sodar or lidar apparatus for at least the orientation of the apparatus, comprising:
    using sensors mounted to the sodar or lidar apparatus to detect at least the three-dimensional angular orientation of the sodar or lidar apparatus;
    using the detected three-dimensional angular orientation and a correction algorithm to correct in situ the wind speed and direction data in three dimensions for deviations from some nominal orientation;
    storing in a database: an identification of the correction algorithm; the detected three-dimensional angular orientation; and the corrected wind speed and direction data; and
    detecting failures of the one or more sensors, and in response to the detection of a failure using the last valid orientation information to correct the wind speed and direction data.

11. The method of claim 10 further comprising detecting the position of the apparatus.

12. The method of claim 11 in which data indicative of the detected position of the apparatus is also stored in the database.

13. The method of claim 10 in which the correction occurs in real time, based on orientation measured on a continuing basis to maintain reliable data accuracy even in the presence of post-installation position or angular shift of the apparatus which might otherwise degrade data accuracy.

14. The method of claim 11 in which directional orientation is measured with an electronic two or three axis compass, and tilt from vertical is measured with a two axis accelerometer-based inclinometer.

15. The method of claim 10, in which angular accelerations, velocities and orientation of the apparatus is measured using one or more gyroscopes, solid-state gyroscopes, or other angular measurement sensors to properly distinguish between angular inclinations and axial accelerations of the apparatus to correct for dynamic motions of the apparatus.

16. The method of claim 10 in which the position of the apparatus is measured using a GPS receiver.

17. The method of claim 16 in which the GPS receiver also measures directional orientation of the apparatus.

18. The method of claim 10 in which the corrections are based on information provided at least in part by a user.

19. The method of claim 18 in which the corrections are based on orientation data input by a user.

20. A method of correcting wind speed and direction data collected by a sodar or lidar apparatus for the orientation and/or position of the apparatus, comprising:
    providing at least the three-dimensional angular orientation of the sodar or lidar apparatus, in which the three-dimensional angular orientation is provided at least in part with one or more instruments coupled to the sodar or lidar apparatus;
    using the provided three-dimensional angular orientation and a correction algorithm to correct in situ the wind speed and direction data in three dimensions for deviations from some nominal orientation;
    storing in a database: an identification of the correction algorithm; the detected three-dimensional angular orientation; and the corrected wind speed and direction data; and
    detecting failures of the one or more instruments, and in response to the detection of a failure using the last valid orientation information to correct the wind speed and direction data.

21. The method of claim 20 in which the three-dimensional angular orientation is provided at least in part by a user who has overridden the instruments.

22. The method of claim 20 in which the three-dimensional angular orientation is provided by a user.

* * * * *